United States Patent [19]
Nemoto

[11] Patent Number: 5,658,048
[45] Date of Patent: Aug. 19, 1997

[54] SEAT WITH SEAT BELT

[75] Inventor: Akira Nemoto, Akishima, Japan

[73] Assignee: Tachi-S Co., Ltd., Tokyo, Japan

[21] Appl. No.: 524,787

[22] Filed: Sep. 7, 1995

[51] Int. Cl.$^6$ .................................................. B60R 22/28
[52] U.S. Cl. ............................ 297/410; 297/473; 297/474
[58] Field of Search ................................. 297/474, 473, 297/463.1, 452.2, 452.18, 410, 483, 391, 475

[56] References Cited

U.S. PATENT DOCUMENTS

| | | | |
|---|---|---|---|
| 4,585,273 | 4/1986 | Higgs et al. | 297/452.18 X |
| 5,088,794 | 2/1992 | Iwami et al. | 297/483 |
| 5,131,720 | 7/1992 | Nemoto | 297/410 |
| 5,232,264 | 8/1993 | Hoshihara . | |
| 5,318,341 | 6/1994 | Griswold et al. | 297/452.18 X |
| 5,362,129 | 11/1994 | Itoh et al. | 297/452.18 X |
| 5,390,982 | 2/1995 | Johnson et al. | 297/410 |
| 5,433,508 | 7/1995 | Akima et al. | 297/410 |
| 5,441,332 | 8/1995 | Verellen | 297/473 X |
| 5,452,941 | 9/1995 | Halse et al. | 297/483 X |

FOREIGN PATENT DOCUMENTS

| | | | |
|---|---|---|---|
| 2916506 | 11/1980 | Germany | 297/474 |
| 4303032 | 10/1992 | Japan | 297/452.18 |
| 4-353055 | 12/1992 | Japan . | |
| 6-72285 | 3/1994 | Japan . | |

*Primary Examiner*—Milton Nelson, Jr.
*Attorney, Agent, or Firm*—Browdy and Neimark

[57] ABSTRACT

A seat with seat belt including a headrest and a seat back, in which both a headrest and a seat belt ingress/egress portion are adjustable in height at the same time, to accommodate an occupant on the seat. A stationary rail member is provided on a seat back frame in a manner erecting therefrom, and a movable rail member is slidably fitted in the stationary rail. Connected to the movable rail member are a headrest stay member fixed to the headrest and a guide member defining the seat belt ingress/egress portion, on which the seat belt is turned from the inside of seat back towards the outside of same. Thus, the movable rail member may be moved vertically along the stationary rail member so as to enable upward and downward motion of both headrest stay member and guide member to adjust both heights of the headrest and seat belt ingress/egress portion at one time.

16 Claims, 3 Drawing Sheets

SEAT WITH SEAT BELT

BACKGROUND OF INVENTION

1. Field of Invention

The present invention relates to a seat provided with a seat belt thereon for use in an automobile, and in particular to a construction of an automotive seat of a seat-belt-retractor built-in type wherein a vertically movable seat belt ingress/egress portion is provided to permit an occupant on the seat to adjust a position of the seat belt according to his or her need to relieve the restrain of the seat belt.

2. Description of Prior Art

Among various automotive seats, there is a seat with a seat belt, of the type capable of adjusting a position of the seat belt and having a seat belt retractor built therein. Conventionally, as typically disclosed in the Japanese Laid-Open Patent Publication No. 4-353055, most seats of this kind have been so constructed that a seat belt retractor is provided within a seat back of the seat, and that a seat belt ingress/egress portion, through which a seat belt is drawn out of or back in the seat back with respect to that retractor, is defined in the upper part of the seat back in a vertically movable manner. Such arrangement allows an occupant sitting on the seat to adjust the seat belt ingress/egress portion at a desired position, vertically, according to his or her own seated height, and thereby the occupant, whether tall or small, can set an optimal position of the seat belt to attain a comfortable restrain to the seat.

The foregoing seat belt position adjusting arrangement may also be given in a seat having a vertically movable headrest. In that case, an occupant on the seat can set the headrest at a desired position corresponding to the head in accordance with his or her seated height. However, this particular type of seat has been found troublesome in operation, due to the seat belt and headrest adjustments having to be made, independently of each other, so that one of them must be done before another of them, or vice versa.

SUMMARY OF THE INVENTION

In view of the above-stated drawbacks, it is therefore a primary purpose of the present invention to provide an improved structure of a seat with a seat belt which permits both headrest and seat belt ingress/egress portions to be adjusted in height simultaneously to accommodate height of an occupant on the seat.

To attain such purpose, a seat with seat belt in accordance with the present invention is basically comprised of:

a seat back frame provided in a seat back;

a stationary rail means which is fixed on the seat back frame in such a manner as to erect therefrom;

a movable rail means which is so engaged with the stationary rail means as to be slidable vertically therealong;

a vertical movement mechanism disposed within the seat back, the vertical movement mechanism being operatively connected with the movable rail means so as to cause the same to be moved vertically along the movable rail means;

a retractor disposed within the seat back, wherein the seat belt may be drawn out of or back into the retractor;

a guide means provided integrally with the movable rail means, on which guide means, the seat belt extended from the retractor is turned in a direction outwardly of the seat back towards a side where an occupant sits on the seat; and a headrest stay means securely attached at one end thereof to the movable rail means, the headrest stay means being connected to a headrest at another end thereof.

Accordingly, operation of the vertical movement mechanism permits the headrest and the guide means, which defines a seat belt ingress/egress portion, to be adjusted in height at the same time, according to the height of occupant on the seat.

As one aspect of the invention, the stationary rail means may comprise a pair of stationary rail members whereas the movable rail means may comprise a pair of movable rail members, and further a pair of spaced-apart upstanding support members may be provided on an upper frame section of the seat back frame, with such arrangement that the two stationary rail members are each integrally fixed to respective two opposedly facing inward walls of the two upstanding support members, and that the two movable rail members are connected with each other via the foregoing guide means and are each engaged slidably with the respective two stationary rail members.

It is a second purpose of the invention to provide a robust structure to the above-mentioned seat back frame in which a drive force of the vertical adjustment mechanism and a load from the seat belt may be dispersed effectively to the frame.

To this end, the seat back frame may comprise an upper horizontal frame member, a pair of lateral frame members, each extending downwardly from respective both ends of the upper horizontal frame member, and a reinforcing member extending on a diagonal line between one end of the upper horizontal frame member to a lower end of the lateral frame member, on the opposite end of the upper horizontal frame member, wherein the foregoing upstanding support means may be disposed at a point on the upper horizontal frame member, which corresponds to an apex of a triangle defined by one of the two lateral frame members, the reinforcing member and a lower side of the seat back frame.

Accordingly, a load from the seat belt as well as a drive force from the vertical adjustment mechanism will be dispersed to such triangular frame structure of the seat back frame, which makes the seat back frame rigid and robust.

Any other various features and advantages of the present invention will become apparent from the reading of the detailed descriptions hereinafter, with reference to the drawings.

DETAILED DESCRIPTION OF PREFERRED EMBODIMENT OF THE INVENTION

Figure 1:
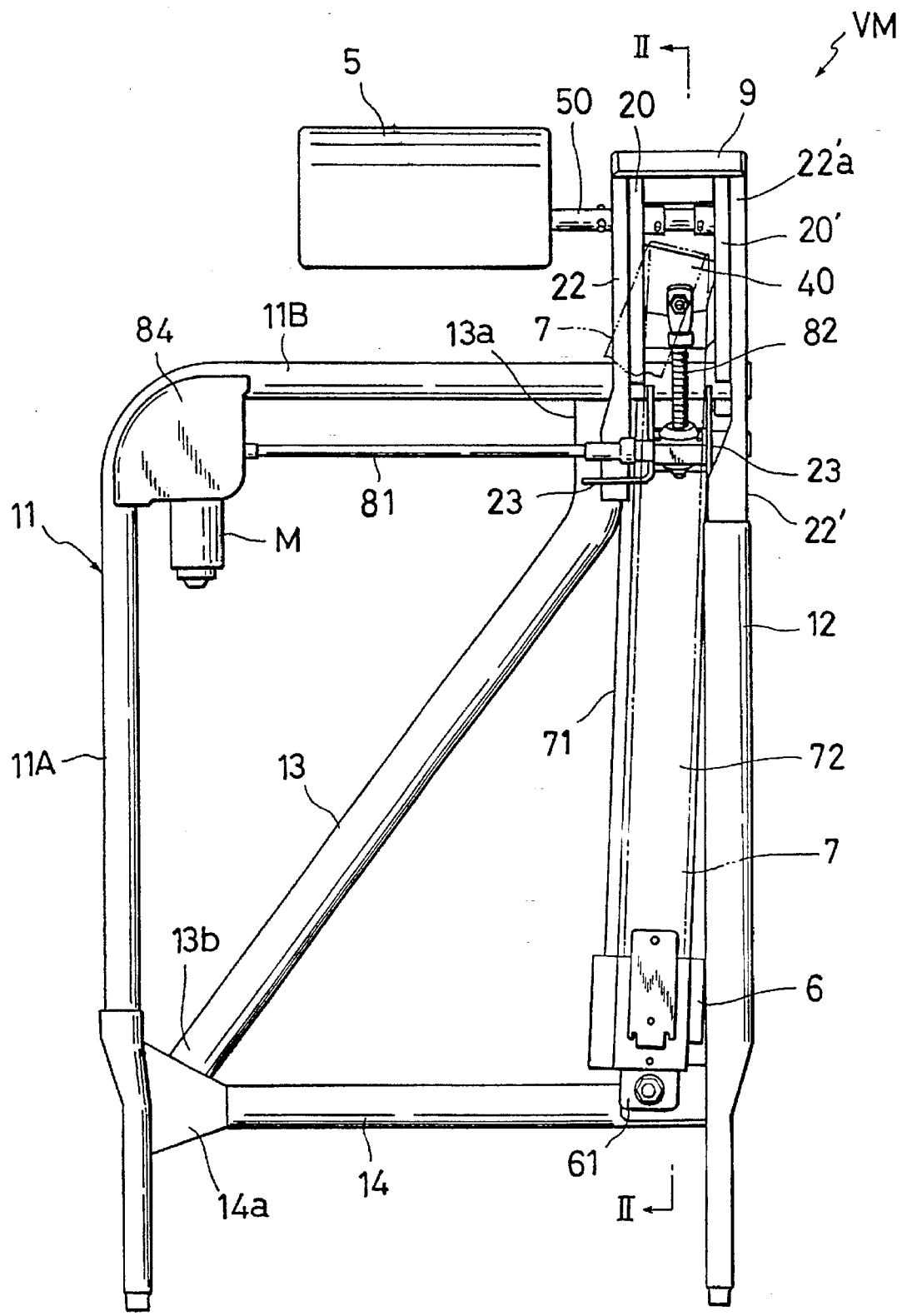
FIG. 1 is a schematic front view of a seat back frame for use in a seat with seat belt in accordance with the present invention, showing a basic framework of the seat back frame.

Referring to FIG. 1, there is illustrated, generally, a framework forming a seat back frame, in accordance with the present invention, in which a headrest (5) and a seat belt (7) are provided movably for a purpose to be described hereinafter.

As can be seen from FIG. 1, the seat back framework is basically formed by: an inverted-L-shaped frame member

(11) composed of an upper horizontal frame section (11B) and a vertical side frame section (11A); a side frame member (12) extending in parallel with the vertical side frame section (11A); and a lower horizontal frame member (14) extending in parallel with the upper horizontal frame section (11B).

Designation (VM) represents a vertical movement mechanism which, as viewed from FIG. 1, is mounted and erected on the right-side end portion of the upper horizontal frame section section (11B). This mechanism (VM) includes a pair of spaced-apart first and second upstanding support members (22)(22'). As will be described later, through operation of the mechanism (VM), both headrest (5) and seat belt (7) may be adjustably moved in a vertical direction with respect to the framework.

The two upstanding support members (22)(22') are welded fast on a free end part of the upper horizontal frame section (11B). Of those two support members, the second one (22') is fixedly connected at the lower end thereof to the upper end of the side frame member (12), as shown.

The lower frame member (14) is shown to be extended between and connected with the lower end portions respectively of the vertical side frame section (11A) and the side frame member (12). In this regard, designation (14a) denotes a connecting bracket by which the corresponding end of the lower frame member (14) is connected to the lower end portion of vertical side frame section (11A).

A reinforcing member (13) is shown to be provided within a space surrounded by the above-constructed seat back framework such as to extend on a diagonal line between the vertical movement mechanism (VM) and the connecting bracket (14a). Namely, the reinforcing member (13) is connected to the bracket (14a) at one end thereof (13b) and connected at another end thereof (13a) to the free end portion of the upper horizontal section (11B) where the vertical movement mechanism (VM) is mounted.

Welded at the corner of the inverted-L-shaped frame member (11) is a bracket (84) which not only supports a motor (M) forming a part of the vertical movement mechanism (VM), but also reinforces a strength of the frame member (11) itself.

A seat belt retractor (6) is fixedly mounted on the right-side end portion of lower horizontal frame member (14) opposite to the left-side end portion of same connected to the bracket (14a). Thus, the retractor (6) is disposed downwardly of the framework and also in a diagonal relation with the bracket (84) located at the corner of inverted-L-shaped frame member (11). As with ordinary known retractors, the seat belt (7) is accommodated in a webbing state within the retractor (6) and may be drawn out therefrom or back therein for adjustment in length of the seat belt (7).

Figure 3:
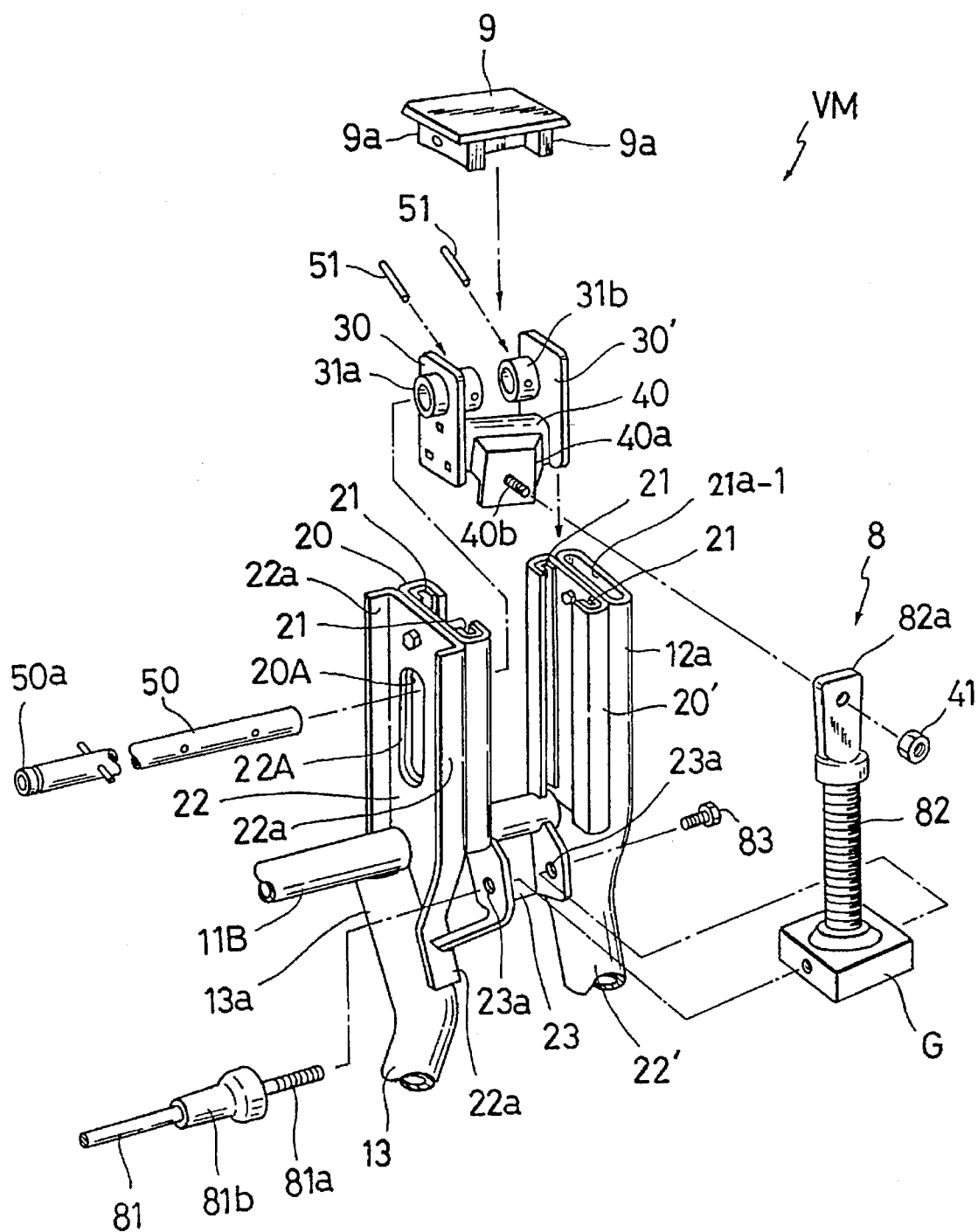
FIG. 3 is a partly broken, exploded perspective view of a principal part the present invention.

As best seen from FIG. 3 in conjunction with FIG. 1, the vertical movement mechanism (VM) is basically comprised of: a pair of spaced-apart first and second upstanding support members (22)(22'); a pair of first and second stationary rail members (20)(20'), each being formed to have a channel cross-section to define a sliding engagement portion therein; a pair of first and second movable rail members (30)(30'), each being slidably fitted in such sliding engagement portions of the two stationary rail members (20)(20'), respectively; a guide member (40) firmly provided between those two movable rail members (30)(30'); a headrest stay rod member (50) fixedly connected to the movable rail members (30)(30'); an elevating device (8) for raising and lowering the movable rail members (30)(30') in a vertical direction along the stationary rail members (20)(20') and a drive source such as a motor (M) connected operatively to that elevating device (8).

The first upstanding support member (22) is formed to have a channel cross-section and thus include a pair of outwardly extending spaced-apart flanges (22a)(22a). Further, an elongated guide hole (22A) is perforated in the coplanar body part of the same support member (22), which is defined between the two flanges (22a)(22a). The guide hole (22A) has a certain vertical length which limits upward and downward movement range of the movable rail members (30)(30'), as will become apparent hereinafter. As shown in FIG. 3, this support member (22) is firmly welded at its lower end portion to both upper horizontal frame section (11B) and upper vertical end part (13a) of reinforcing member (13).

The second upstanding support member (22') is depicted as being formed from a tubular material, which includes a tubular body section (22'b) and an upper flattened section (22'a) defined therein. The upper flattened section (22'a) is of course formed by collapsing the corresponding part of the tubular body, but the degree of the collapse should be such as to create a slot-like hole (12a-1) therein, as best seen in FIG. 3. Formation of such slot-like hole (12a-1) conveniently provides a securing hole into which is securely fitted one leg portion (9a) of a cap member (9). The similar convenient effect is found in the first support member (22) as well. That is, as stated above, the first support member (22) is of a channel cross-section, having two spaced-apart flanges (22a)(22a), and therefore, another leg portion (9a) of the cap member (9) can be fitted between the two flanges (22a)(22a).

As illustrated, both first and second upstanding support members (22)(22') extend upwardly a same distance from the horizontal line of the upper frame section (11B), defining therefrom two opposedly faced flat planes of a same width, which thus forms two opposedly faced inward surfaces respectively of the support members (22)(22').

Secured respectively to such two opposedly faced inward surfaces of the support members (22)(22') is each of the foregoing pair of stationary rail members (20)(20'). Both stationary rail members (20)(20') are equal in length to each other and also generally equal in both length and width to those two inward surfaces of support members (22)(22'). Hence, the stationary rail members (20)(20') may be formed from the same material of identical shape to save costs in the assemblage, with the exception that the first rail member (20) should be formed with an elongated guide hole (20A) in correspondence with the previously mentioned elongated guide hole (22A) of the first support member (22) so that the two holes (20A)(22A) coincide with each other for establishing one guide hole along which the headrest stay rod member (50) will be moved vertically as will be described later.

Designations (21) denote sliders made of a hard synthetic resin material, which are each fixed in the stationary rail members (20)(20'), respectively, as shown.

The first and second movable rail members (30)(30') are so connected with each other via the guide member (40) as to have a distance therebetween which allows the two members (30)(30') themselves to be slidably fitted in the foregoing two stationary rail members (20)(20'), respectively. As in FIG. 3, the first rail member (30) is provided with a support sleeve member (31a) which penetrates therethrough, whereas the second rail member (30') has a support sleeve member (31b) fixed to the inward wall thereof. Those two support sleeve members (31a)(31b) are disposed in a coaxial alignment with each other and located above the guide member (40) with a certain distance therefrom. As understandable from FIGS. 1 and 3, the guide member (40) has a smooth upper cambered surface which is inclined at a proper angle in the direction inwardly of the seat back framework (11, 12, 14). A connecting bracket (40a) is formed integrally with that guide member (40), from which connecting bracket, a securing screw (40B) extends outwardly.

The thus-formed two movable rail members (30)(30') are fitted slidably in the respective two stationary rail members (20)(20') via the sliders (21) such as to be free to move vertically towards and away from the upper horizontal frame section (11B). Then, the base end portion of the headrest stay rod member (50) is inserted through the elongated guide holes (20A)(22A) into both two sleeve members (31a)(31b) of the movable rail members (30)(30') and fixedly secured thereto by means of two securing pins (51)(51). In this respect, it can be observed in FIG. 3 that securing holes are formed in that base end of stay rod member (50) and also formed in each of the support sleeve members (31a)(31b), and that the securing pins (51)(51) may be inserted and secured in the securing holes, to thereby secure the base end portion of stay rod member (50) to the movable rail members (30)(30'). This arrangement is, however, one preferred example and may be altered to another suitable securing arrangement such as by welding or the like. The headrest stay rod member (50) has a free end portion (50a) to which the headrest (5) is securely connected as in FIG. 1.

In the embodiment shown, the elevating device (8) is of a known lead screw structure comprising a gear box (G), a lead screw (82) and a connecting section (82a). As shown in FIG. 3, the connecting section (82a) integral with the upper end of the lead screw (82) is securely connected to the connecting bracket (40a) by threadedly engaging the securing nut (41) with the screw (40b). On the other hand, the gear box (G) is securely supported on a bracket (23) welded fast to the part of the upper horizontal frame section (11B) where the two upstanding support members (22)(22') erect. The bracket (23) is formed with two through-holes (23a)(23a). Thus, fixation of the gear box (G) to the bracket (23) is made by inserting a securing screw (83) through one of the through-holes (23a) and screwed in one side of the gear box (G). Although not shown, the gear box (G) contains a bevel gear fixed to a nut member having an inwardly threaded part with which the lead screw (82) is engaged threadedly. As indicated in FIG. 3, the threaded end portion (81a) of a cable (81) is connected via another of through-holes (23a) to the gear box (G) and further, though not shown, engaged with that bevel gear in the same box (G). The cable (81) is connected at another end thereof to the motor (M). Accordingly, operating the motor (M) transmits a rotation force through the cable (81) to the gear box (G), thereby causing the nut member (not shown) to be rotated to cause vertical movement of the lead screw (82) along the longitudinal direction thereof, which enables both headrest stay rod member (50) and guide member (40) to be moved vertically at one time by simply operating the motor (M). For that purpose, though not shown, the motor (M) is electrically connected with a switch for adjusting normal and reverse drive of the motor (M), the switch being preferably provided on the lateral side of a seat cushion (SC) shown in FIG. 4. This drive mechanism is not a major principal part of the present invention and any other drive and transmission means may be utilized to transform the rotation force of motor (M) into a vertical motion of the elevating device (8). The cable (81) may be secured by a socket member (81b) to one side of the bracket (23) as can be seen from FIG. 3.

Figure 2:
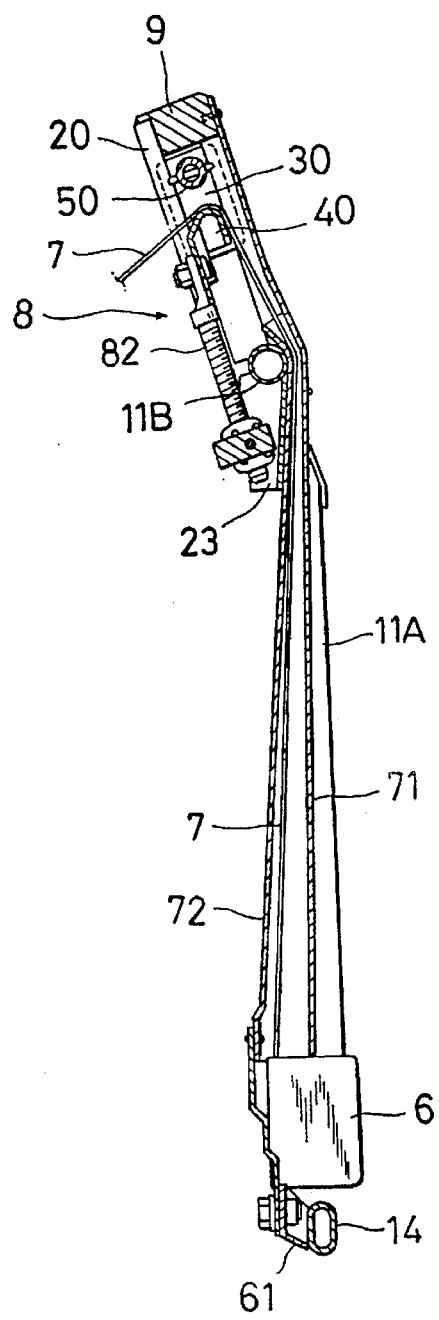
FIG. 2 is a sectional view taken along the line II—II in the FIG. 1.

Referring to FIGS. 1 and 2, the seat belt (7) is extended upwardly from the retractor (6) along the longitudinal direction of the side frames (11A)(12), passing behind the upper horizontal frame section (11B), and turned about the upper cambered surface of guide member (40) to extend in the direction outwardly and forwardly of the framework (11, 12, 14); namely, in the direction towards the side where an occupant is to sit. It is to be understood that a point at the guide member (40) can be regarded as a seat belt ingress/egress portion through which the seat belt (7) will be drawn out or back with respect to the retractor (6). Preferably, the guide member (40) may be formed from a metallic or hard synthetic resin material coated with a dry-film-type lubricant in order to facilitate the ease with which the seat belt (7) slides upon the guide member (40) with a minimized friction therebetween.

Figure 4:
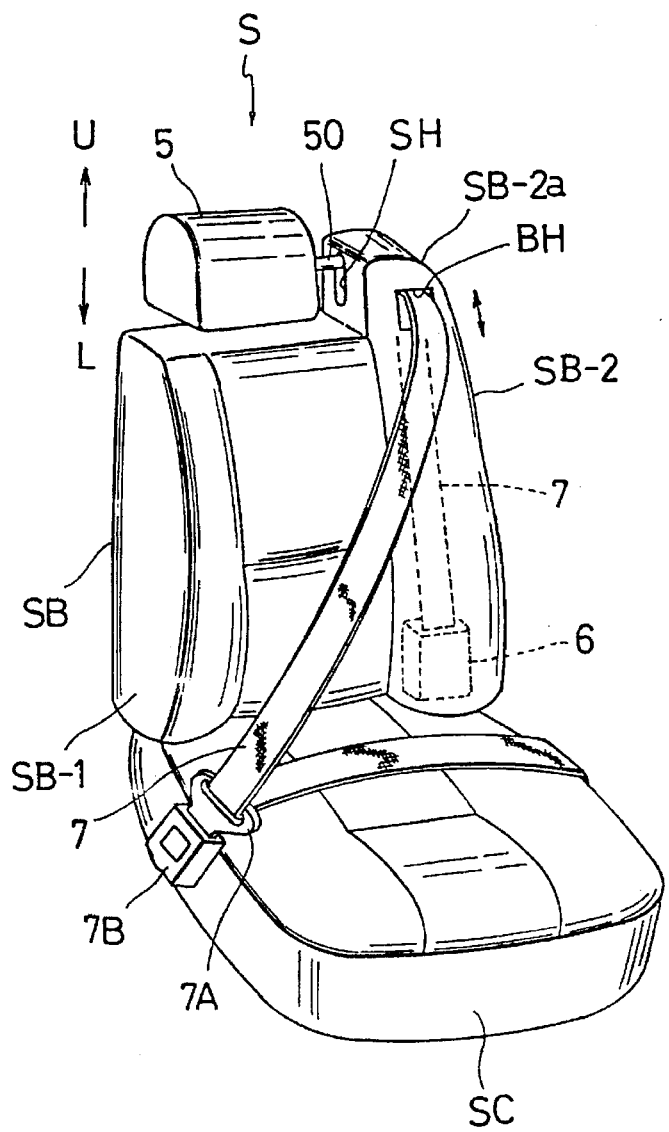
FIG. 4 is a schematic perspective view of a seat to which the present invention is applied.

The seat belt (7) further extends downwardly from that ingress/egress portion (40) at an inclined angle towards one lateral side of the seat cushion (SC) as understandable from FIGS. 1 and 4.

Designations (71)(72) stand for a forward seat belt cover member and a backward seat belt cover member, respectively. The arrangement of those forward and backward seat belt cover members (71)(72) is such that the former (71) is disposed forwardly of the framework (11, 12, 14) while the latter (72) is disposed backwardly of the same framework, to protect the seat belt (7) from both forward and backward sides. The specific connection of those two cover members (71)(72) to the framework may be understood by viewing FIGS. 1 and 2, and since this is not the main subject matter of the present invention, any further explanation is not given thereabout.

The cap member (9) is secured upon the top ends of the first and second stationary rail members (20)(20') to cover the opened side thereof, which also provides a detent against excessive upward movement of the movable rail members (30) (30'). As mentioned earlier, such securing of cap member (9) is effected by fitting and fixing its two leg portions (9a)(9a) in the channel portion of the first support member (22) and in the slot-like opening (12a-1) of the second support member (22'), respectively, as by means of securing screws.

The whole framework thus assembled may be provided in the back upholstery unit (SB). The seat back upholstery unit (SB) may be formed in the manner shown in FIG. 4, having one lateral bolster portion (SB-2) on which an integral upstanding housing (SB-2a) is formed, so that the retractor (6), seat belt (7), the upstanding elements of the vertical movement mechanism (VM) (such as the two upstanding support members (22)(22'), guide member (40), elevating device (8) and etc.) and side frame member (12) are bodily accommodated in those lateral bolster portion (SB-2) and upstanding housing (SB-2a). In particular, the housing (SB-2a) is formed with a vertically elongated hole (SH) for allowing the vertical movement of the headrest stay rod member (50) therealong and another vertically elongated hole (BH) for allowing the seat belt ingress/egress portion (at 40) and seat belt (7) itself to be shifted vertically therealong. As shown in FIG. 4, the free end of seat belt (7) is provided with a connector (7A) to be releasably engaged with a seat belt socket (7B) fixed on the lateral wall of seat cushion (SC).

With the present invention constructed above, operation of the motor (M) causes both headrest (5) and seat belt ingress/egress portion (40) to be adjustably raised or lowered at one time, as indicated by both big arrows (U)(L) and small arrows in FIG. 4, without any troublesome separated operations for adjusting each of headrest and seat belt as found in the prior art devices.

In addition thereto, the present invention has the following structural advantages:

(1) The principal part of the invention can be assembled easily in a given order of assembling steps: Namely, as shown in FIG. 3, firstly the movable rail members (30, 30') with the guide member (40) provided therein are fitted in the stationary rail members (20, 20'), then the headrest stay rod member (50) is fixed to the movable rail members (30, 30') through the guide holes (20A, 22A) and finally the cap member (9) is secured upon the upper opened side of stationary rail members (20, 20'), in this order. Thus, after that well-ordered assembling steps, the elevating device (8) can be readily fixed to those principal elements as indicated in FIG. 3, and also the seat belt (7) can be readily passed through the guide member (40) in the outward direction towards the seat cushion (SC).

(2) The retractor (6) is located at the lower side of the framework as in FIG. 1, in view of the weight of retractor (6) being quite heavy. This effectively counterbalances an intensive weight at the upper side of framework which is applied from the motor (M) and vertical movement mechanism (VM), whereby the center of gravity is lowered in the framework to keep the seat back upholstery unit (SB) stable.

(3) Since the seat belt (7) passes behind the upper horizontal frame section (11B) and extends outwardly from the guide member (40), there is eliminated the possibility of the seat belt (7) being interfered or entangled with the elevating device (8), and also the seat belt (7) per se is kept away from a point where the back of an occupant sitting on the seat applies a pressure, thus preventing a weight of the occupant from being applied to the seat belt (7).

(4) Most elements of the vertical movement mechanism (VM) are disposed at an upper apex of a triangle frame structure defined by the reinforcing member (13), lower frame member (14) and side frame member (12), as can be understood from FIG. 1. Thus, the base for supporting the principal part is increased in rigidity, and a drive force from the elevating device (8) as well as a load applied to the seat belt (7) from an occupant on the seat are dispersed to the upper frame section (11B), reinforcing member (13) and side frame member (12), thereby reducing those intensive forces which will be directly exerted on the upstanding support members (22)(22').

While having described the present invention thus far, it should be understood that the invention is not limited to the illustrated embodiment, but any other modifications, replacements and additions may be structurally applied thereto without departing from the scope of the appended claims.

What is claimed is:

1. A seat with a seat belt, which includes a seat back and a headrest, comprising:
   a seat back frame provided in said seat back;
   a pair of spaced-apart upstanding support means provided integrally on an upper frame section of said seat back frame;
   a pair of stationary rail means, each being integrally fixed respectively to two opposedly facing inward walls of said pair of spaced-apart upstanding support means;
   a pair of movable rail means, each being respectively slidably engaged with each of said pair of stationary rail means;
   a vertical movement mechanism disposed within said seat back, said vertical movement mechanism being operatively connected with said pair of movable rail means, wherein operation of said vertical movement mechanism causes said pair of movable rail means to move vertically along said pair of stationary rail means;
   a retractor disposed within said seat back, wherein said seat belt may be drawn out of and back into said retractor;
   a guide means provided integrally with said pair of movable rail means, on which guide means, the seat belt extended from said retractor is turned in a direction outwardly of said seat back towards a side where an occupant sits on the seat;
   said pair of movable rail means being connected with each other by said guide means; and
   a headrest stay means securely attached at a first end thereof to said pair of movable rail means, said headrest stay means being connected to said headrest at a second end thereof;
   wherein said stationary rail means is formed with an elongated guide hole through which said headrest stay means is slidably inserted and fixed to said movable rail means, such that said headrest stay means is movable vertically along said elongated guide hole, while allowing both said movable rail means and guide means to be movable together with said headrest stay means in a vertical direction along said stationary rail means within a movable range determined by said elongated guide hole.

2. The seat as defined in claim 1, wherein said retractor is mounted at a lower side of said seat back frame.

3. The seat as defined in claim 1, wherein a cap member is secured on an upper end of said stationary rail means.

4. The seat as defined in claim 1, wherein said seat back frame comprises an upper horizontal frame member, a pair of lateral frame members, each extending downwardly from a respective end of said upper horizontal frame member, and a reinforcing member extending on a diagonal line between one said end of said upper horizontal frame member and a lower end of a lateral frame member of said lateral frame member on another end of said upper horizontal frame member, and wherein said pair of spaced-apart upstanding support means is disposed at a point upon said upper horizontal frame member, which corresponds to an apex of a triangle defined by said lateral frame member, said reinforcing member and a lower side of said seat back frame.

5. The seat as defined in claim 4, wherein a lower horizontal frame member is provided at said lower side of said seat back frame and is connected between both lower end portions of said pair of lateral frame members.

6. A seat with a seat belt, which includes a seat back and a headrest, comprising:
   a seat back frame provided in said seat back;
   a pair of spaced-apart upstanding support means provided integrally on an upper frame section of said seat back frame;
   a pair of stationary rail means, each being integrally fixed respectively to two opposedly facing inward walls of said pair of spaced-apart upstanding support means;
   a pair of movable rail means, each being respectively slidably engaged with each of said pair of stationary rail means;

a vertical movement mechanism disposed within said seat back, said vertical movement mechanism being operatively connected with said pair of movable rail means, wherein operation of said vertical movement mechanism causes said pair of movable rail means to move vertically along said pair of stationary rail means, a retractor disposed within said seat back, wherein said seat belt may be drawn out of and back into said retractor;

a guide means provided integrally with said pair of movable rail means, on which guide means, the seat belt extended from said retractor is turned in a direction outwardly of said seat back towards a side where an occupant sits on the seat;

said pair of movable rail means being connected with each other by said guide means; and a headrest stay means securely attached at a first end thereof to said pair of movable rail means, said headrest stay means being connected to said headrest at a second end thereof;

wherein one of said pair of spaced-apart upstanding support means and one of said pair of stationary rail means, which is fixed to said one of said pair of spaced-apart upstanding support means, are both formed with an elongated guide hole through which said headrest stay means is slidably inserted and fixed to said pair of movable rail means, such that said headrest stay means is movable vertically along each said elongated guide hole, while allowing both said pair of movable rail means and said guide means to be movable together with said headrest stay means in a vertical direction along said pair of spaced-apart stationary rail means within a movable range determined by said elongated guide hole.

7. A seat with a seat belt, which includes a seat back and a headrest, comprising:

a seat back frame provided in said seat back;

a stationary rail means which is fixed on said seat back frame in such a manner as to extend therefrom;

a movable rail means which is so engaged with said stationary rail means as to be slidable vertically therealong;

a vertical movement mechanism disposed within said seat back, said vertical movement mechanism being operatively connected with said movable rail means so as to cause the same to be moved vertically along said stationary rail means;

a retractor disposed within said seat back, wherein said seat belt may be drawn out of and back into said retractor;

a guide means provided integrally with said movable rail means, on which guide means, the seat belt extended from said retractor is turned in a direction outwardly of said seat back towards a side where an occupant sits on the seat;

a headrest stay means securely attached at one end thereof to said movable rail means, said headrest stay means being connected to said headrest at another end thereof; and a seat back upholstery unit covering said seat back frame, said seat back upholstery unit also covering said vertical movement mechanism and retractor and being so formed to define a means for housing therein said pair of stationary rail means, movable rail means, guide means and headrest stay means, and wherein said means for housing has one elongated hole through which said headrest stay means is extended outwardly and fixed to said headrest, and another elongated hole through which said seat belt extends from said guide means in a direction outwardly of said seat back upholstery unit.

8. A seat with a seat belt, which includes a seat back and a headrest, comprising:

a seat back frame provided in said seat back;

a pair of spaced-apart upstanding support means provided integrally on an upper frame section of said seat back frame;

a pair of stationary rail means, each being integrally fixed respectively to two opposedly facing inward walls of said pair of upstanding support means;

a pair of movable rail means, each being slidably engaged with the respective said pair of stationary rail means;

a guide means provided integrally with and between said pair of movable rail means;

an elongated guide hole formed in one of said pair of upstanding support means;

a retractor disposed within said seat back, wherein said seat belt may be drawn out of and back into said retractor;

said seat belt being extended from said retractor and turned on said guide means in a direction outwardly of said seat back towards a side where an occupant sits on the seat;

a vertical movement mechanism disposed within said seat back, said vertical movement mechanism being operatively connected with said pair of movable rail means and operable to cause vertical movement of said pair of movable rail means along said pair of stationary rail means; and a headrest stay means slidably inserted through said elongated guide hole such as to be movable vertically in a direction along said pair of stationary rail means, said headrest stay means being securely attached at a first end thereof to said pair of movable rail means, and being connected to said headrest at a second end thereof;

wherein operation of said vertical movement mechanism causes both said pair of movable rail means and said guide means to move together with said headrest stay means in a vertical direction along said pair of stationary rail means.

9. The seat as defined in claim 8, wherein a first of said pair of spaced apart upstanding support means is fixed to a second of said pair of spaced apart upstanding support means, providing a connected area therebetween, and said elongated guide hole is formed in said connected area.

10. The seat as defined in claim 8, wherein said seat back frame comprises an upper horizontal frame member, a pair of lateral frame members, each extending downwardly from a respective end of said upper horizontal frame member, and a reinforcing member extending on a diagonal line between one said end of said upper horizontal frame member and a lower end of a lateral frame member of said lateral frame members on a another end of said upper horizontal frame member, and wherein said pair of spaced-apart upstanding support means is disposed at a point upon said upper horizontal frame member, which corresponds to an apex of a triangle defined by said lateral frame member, said reinforcing member and a lower side of said seat back frame.

11. The seat as defined in claim 10, wherein a lower horizontal frame member is provided at said lower side of said seat back frame and is between both lower end portions of said pair of lateral frame members.

12. The seat as defined in claim 8, wherein said seat back frame comprises:

an upper horizontal frame member, a pair of lateral frame members each extending downwardly from respective both ends of said upper horizontal frame member, a lower frame member connected between both lower end portions respectively of said pair of lateral frame members and a reinforcing member extending diagonally from said upper horizontal frame member to said lower frame member, and said upstanding support means is disposed at a point upon said upper horizontal frame member, which corresponds to an apex of a triangle defined by one of said pair of lateral frame members, said reinforcing member and said lower frame member.

13. The seat as defined in claim 8, wherein said seat back frame comprises: an upper horizontal frame member, where said pair of upstanding support means is disposed; a pair of lateral frame members each extending downwardly from respective both ends of said upper horizontal frame member; and a lower frame member connected between both lower end portions respectively of said pair of lateral frame members, and said retractor is mounted on said lower frame member of said seat back frame.

14. The seat as defined in claim 8, wherein said retractor is disposed on a lower frame at a point under said pair of upstanding support means.

15. The seat as defined in claim 8, wherein a cap member is secured on upper ends of said pair of stationary rail means.

16. The seat as defined in claim 8, further comprising a seat back upholstery unit covering said seat back frame, said seat back upholstery unit also covering said vertical movement mechanism and retractor and being so formed to define a means for housing therein said pair of stationary rail means, said pair of movable rail means, said guide means, and said headrest stay means, and wherein said means for housing has one elongated hole through which said second end of said headrest stay means is extended outwardly and fixed to said headrest, and another elongated hole through which said seat belt extends from said guide means in a direction outwardly of said seat back upholstery unit.

* * * * *